(12) United States Patent
Buch et al.

(10) Patent No.: US 9,202,477 B2
(45) Date of Patent: Dec. 1, 2015

(54) PIN-EFFICIENT READER BIAS ENABLE CONTROL

(71) Applicant: Seagate Technology LLC, Cupertino, CA (US)

(72) Inventors: Bruce Douglas Buch, Westborough, MA (US); Stefan Ionescu, Burnsville, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/513,328

(22) Filed: Oct. 14, 2014

(65) Prior Publication Data

US 2015/0029613 A1    Jan. 29, 2015

Related U.S. Application Data

(62) Division of application No. 13/550,296, filed on Jul. 16, 2012, now Pat. No. 8,861,115.

(51) Int. Cl.
*G11B 5/09* (2006.01)
*G11B 5/012* (2006.01)
*G11B 5/02* (2006.01)
*G11B 19/02* (2006.01)

(52) U.S. Cl.
CPC ........ *G11B 5/09* (2013.01); *G11B 5/012* (2013.01); *G11B 5/02* (2013.01); *G11B 19/02* (2013.01)

(58) Field of Classification Search
None
See application file for complete search history.

(56) References Cited

U.S. PATENT DOCUMENTS

| | | | |
|---|---|---|---|
| 4,868,691 A | 9/1989 | Kawasaki | |
| 5,623,378 A | 4/1997 | Shibasaki et al. | |
| 5,724,201 A | 3/1998 | Jaffard et al. | |
| 6,219,194 B1 | 4/2001 | Stein et al. | |
| 6,310,740 B1 * | 10/2001 | Dunbar et al. | 360/46 |
| 7,133,233 B1 | 11/2006 | Ray et al. | |
| 7,443,627 B1 * | 10/2008 | Krishnamoorthy et al. | 360/69 |
| 7,477,467 B1 | 1/2009 | Sutardja | |
| 7,876,517 B2 | 1/2011 | Buch et al. | |
| 7,880,999 B2 | 2/2011 | Benakli et al. | |
| 7,969,676 B2 | 6/2011 | Buch et al. | |
| 8,861,115 B2 | 10/2014 | Buch et al. | |
| 2003/0156343 A1 | 8/2003 | Freitas et al. | |
| 2006/0193071 A1 * | 8/2006 | Choi et al. | 360/46 |
| 2007/0236819 A1 * | 10/2007 | Hashizume | 360/67 |

OTHER PUBLICATIONS

Oct. 14, 2014 File History for U.S. Appl. No. 13/559,296 as retrieved from the U.S. Patent and Trademark Office Pair System on Oct. 14, 2014, 98 pages.

* cited by examiner

*Primary Examiner* — Paul Huber
(74) *Attorney, Agent, or Firm* — Hollingsworth Davis, LLC (57) ABSTRACT

Systems and methods are included for determining a presence of an upcoming reading field during a write mode of a storage device, and initiating a read-while write RWW) mode of the storage device in response to the sensed reading field. Initiating the RWW mode comprises warming up the reader circuitry, generating a signal in response to an end to the write operation, and activating reader bias current in response to the generated signal.

17 Claims, 10 Drawing Sheets

PIN-EFFICIENT READER BIAS ENABLE CONTROL

RELATED APPLICATIONS

This application is a divisional of U.S. patent application Ser. No. 13/550,296, filed on Jul. 16, 2012, and which is hereby incorporated herein by reference in its entirety.

SUMMARY

Some embodiments described herein involve systems and methods for determining a presence of an upcoming reading field during a write mode of a storage device; and initiating a read-while write (RWW) mode of the memory device in response to the sensed reading field. In some cases, initiating the RWW mode comprises warming up the reader circuitry, generating a signal in response to an end to the write operation, and activating reader bias current in response to the generating signal.

In some cases, sensing the reading field comprises sensing at least one of a timing field or a servo field. According to various implementations, activating the reader bias current occurs after warming up the reader circuitry. According to various aspects, the write operation is an alternating signal. In some cases, the end to the write operation is an end to an alternating signal. In some cases, warming up the reader circuitry occurs during an alternating write signal.

According to various embodiments, generating the signal comprises generating the signal using a serial interface of a preamplifier of the memory device. In some cases, the RWW mode lasts until a majority of the reading field is read. In some implementations described herein, the RWW mode ends before a majority of the reading field is read. For the purposes of this section, majority means more than 50% of the field is read.

Some embodiments described herein may include systems and methods for transferring configuration data packets to a preamplifier using a serial data port during a first time period and using one or more output pins of the serial data port to enable a function during a second time period. According to various implementations, the first time period is during a time in which no reads or writes are occurring. In some cases, transferring data packets to a preamplifier further comprises transferring data packets used to configure reading and writing preamplifier registers. According to various implementations, one or more pins using of the serial data port are used to transmit signals to enable a reader bias current during the second time period.

In some cases, the function is an RWW function. According to various embodiments described herein, enabling a RWW comprises initiating a warm-up of read circuitry during a write mode of the memory device, ending an alternating write signal at a predetermined amount of time after the initiation of the warm-up of the read circuitry, and using the serial data port to transmit a reader bias current enable signal after the ending of the alternating write signal.

DETAILED DESCRIPTION

In memory storage devices, it can be useful to have read and write functionality enabled simultaneously. Switching to read mode after ending write mode may cause efficiency loss because read circuitry takes time to warm up. Enabling a read operation while a write operation is taking place allows the read circuitry to warm up during a write operation. Once the write is finished and a reading field is ready to be read, the read circuitry is already warmed up. Reader bias current can also be enabled in addition to the reader circuitry in order to read from the memory storage device. The reader bias current circuitry takes a shorter time to warm up than the reader circuitry. Reader bias current is often enabled in response to enabling as the reader as the reader circuitry. Enabling the reader bias current at the same time as the reader circuitry may be problematic, however, in a read-while-write (RWW) mode because having the reader bias current enabled at the same time that a write signal is alternating may shorten the lifespan of the read/write transducer heads of the memory device. According to various aspects, the reader circuitry is circuitry that amplifies a read signal and the reader bias circuitry allows a predetermined direct current into a read transducer of the memory device when enabled.

It may be beneficial to enable the reader bias current at a different time than the reader circuitry to account for the time difference of the warm up times of the read circuitry and the reader bias circuitry. In some cases, the reader bias current is enabled at a later time than the reader circuitry, allowing a write operation to continue while the reader circuitry is warming up. The reader bias current may be enabled after the write signal stops alternating. According to various embodiments described herein, the reader bias current is enabled by a pulse on a serial interface pin of the preamplifier.

Figure 1:
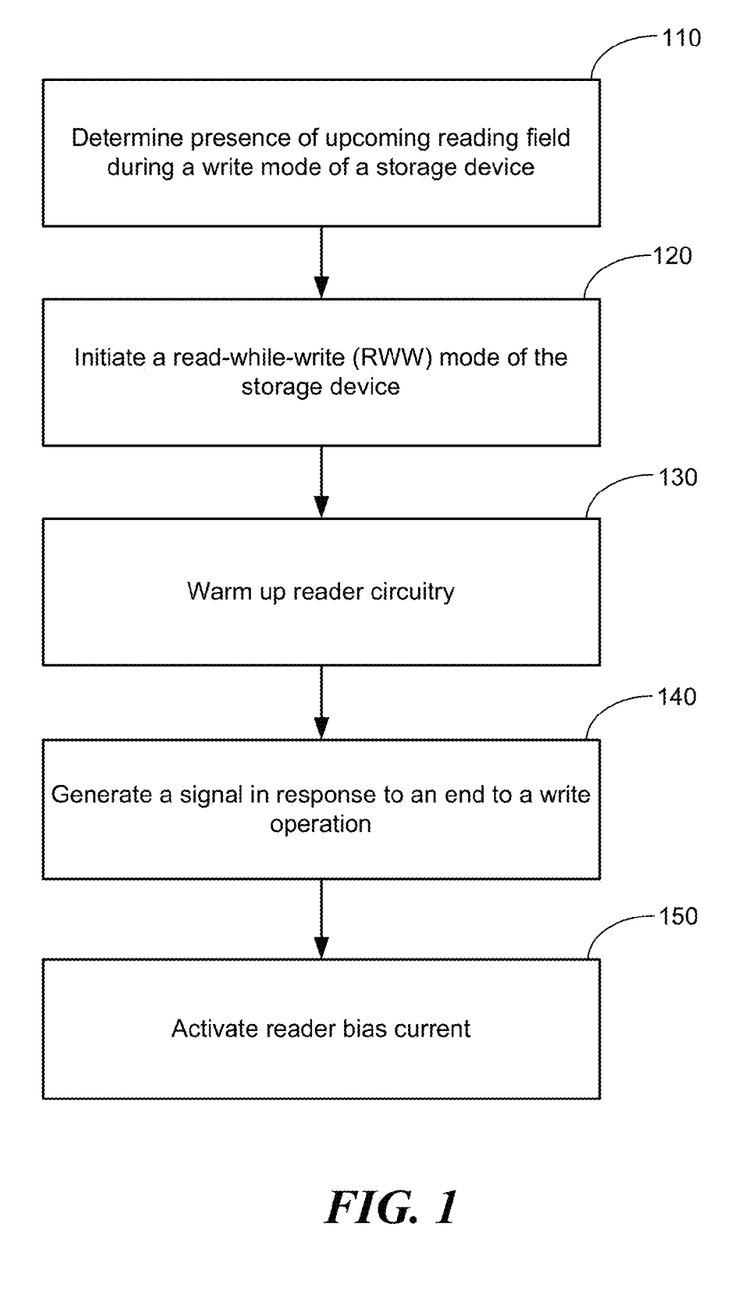
FIG. 1 illustrates a process of switching from a write mode to an RWW mode according to various implementations.

FIG. 1 illustrates a process of switching from a write mode to an RWW mode. The presence of an upcoming reading field is determined 110 during a write mode of a memory device. The write mode may involve an alternating write signal and/or current. The reading field may be a timing field and/or a servo field, for example. In response to the sensed reading field, a RWW mode of the memory device is initiated 120. The reader circuitry is warmed up 130 during the write operation. A signal is generated 140 in response to an end to a write operation. In some cases, the write operation comprises an alternating write signal The alternating write signal may ended at a time after the reader circuitry has started to warm up. In some cases, the alternating write signal stops a predetermined period of time after the RWW mode is initiated. In some implementations, the alternating write signal stops on completion of the warm up of the reader circuitry. According to various embodiments, the alternating write signal stops a predetermined period of time before the reading field. A reader bias current is activated 150 at substantially same time as or after the alternating write signal is stopped. Once the reader circuitry and the reader bias current are warmed-up, the reading field may be read and/or demodulated. After the reading field is read and/or demodulated, the RWW mode may end causing the reader circuitry and the reader bias current to power down and the write signal to begin alternating again to continue with a write operation. In some cases, the write circuitry is powered down during the reading of the reading field and the reading field is read during a read mode. According to various embodiments, after the reading field is read, the device enters an idle mode in which no reads and/or writes are occurring.

Figure 2A:
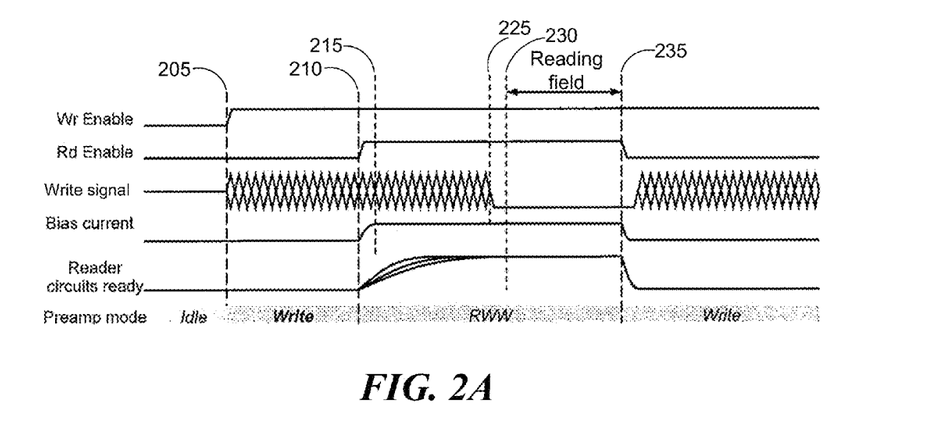
FIGS. 2A-2C are timing diagrams that illustrate a transition from a write mode to a RWW mode in response to a determination of an upcoming reading field in accordance with embodiments described herein.
Figure 2B:
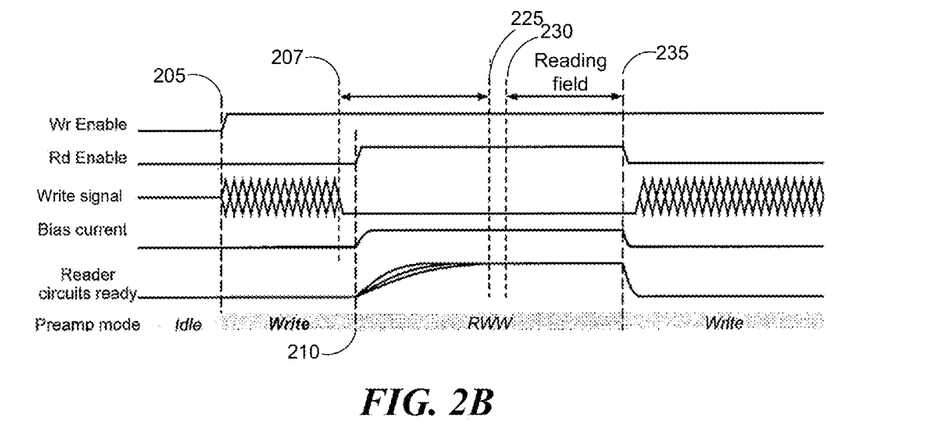
Figure 2C:
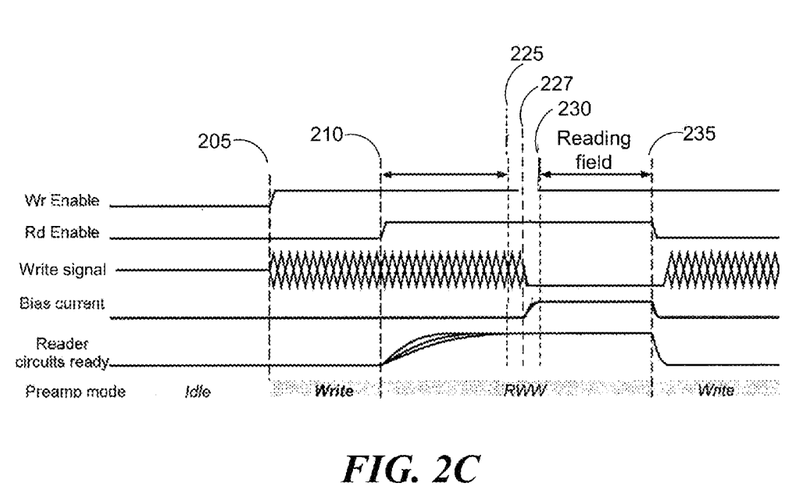

FIGS. 2A-2C are timing diagrams that illustrate a transition from a write mode to a RWW mode. FIG. 2A shows an example in which a write mode is initiated at time 205 from an idle mode. The device starts to switch to an RWW mode in response to a determination of an upcoming reading field that starts at time 230. The device may initiate a switch from a write mode to a RWW mode at a predetermined time period before the beginning of the reading field, for example. The switch from the write mode to the RWW mode begins at time 210 at which time the reader circuitry starts to warm up. The reader circuitry is warmed up starting at time 210 and ending at time 225, before the start of the reading field. The write signal continues to alternate until the reader circuitry is warmed-up, at time 225. The reader bias current circuitry is enabled at substantially the same time as the reader circuitry, at time 210, and takes from time 210 to time 215 to activate. As is shown in the figure, the reader circuitry takes more time to warm up than the reader bias current circuitry.

According to FIG. 2A, the write signal is alternating at the time that the reader bias current circuitry is activated. As can be observed, the reader bias current and the alternating write signal overlap from time 215, until time 225. Having the reader bias current activated concurrently with an alternating write signal may cause electrical over stress, which may compromise the head life and thus may result in a shorter lifespan for the device. After the reading field, the RWW mode ends and a write mode begins, at time 235. Ending the RWW mode includes disabling the reader circuitry and the reader bias current. The write signal begins to alternate again in response to the switch from a RWW mode to a write mode.

One way that may be used to decrease the probability of experiencing electrical overstress is by ending the alternating of the write signal at an earlier time. FIG. 2B shows an example in which the alternating write signal is stopped a period of time before the reader bias current is initiated. Ending the alternating write signal before or at substantially the same time as the reader bias current is enabled may reduce the probability of electrical overstress. As can be observed from FIG. 2B, the alternating write signal is initiated at the same time as in FIG. 2A, at time 205. A determination is made that there is an upcoming reading field. In preparation for the upcoming reading field, the device prepares to transition from a write mode to a RWW mode. The alternating write signal is stopped at an earlier time, at time 207, than in FIG. 2A, to minimize the chance of an overlap of the alternating write signal and the reader bias current. In the example of FIG. 2B, the alternating write signal stops at a time before the initiation of the RWW mode, at time 210. In some implementations, the alternating write signal stops a predetermined period of time before the initiation of the RWW mode. In some cases, the alternating write signal stops at substantially the same time as the initiation of the RWW mode. The reader circuitry and the reader bias current start warming up at time 210. The reader circuitry takes from time 210 until time 225 to warm up in preparation for the upcoming reading field. Again, as in FIG. 2A, the reading field lasts from time 230 until time 235. At time 235 the device transitions back to a write mode by disabling the reader circuitry and the reader bias current and by starting the alternating write signal.

According to FIG. 2B, the write operation is suspended during the time that the read circuitry is warming up. Format loss occurs as a result of the lack of writing that is occurring during the warm up of the reader circuits, from time 210 to time 225. It may be beneficial to allow the write signal to continue to alternate during a warm-up of the reader circuitry and before enabling the reader bias current.

FIG. 2C illustrates an example in which the reader circuitry is warmed up at an earlier time than the reader bias current circuitry is activated. According to FIG. 2C, the reader bias current is enabled at a later time than the reader circuitry allowing the reader circuitry to warm-up at the same time that a write is taking place without potentially causing electrical overstress. As in previous examples, a write mode begins at time 205. At time 210 a switch from write mode to RWW mode is initiated and the reader circuitry begins to warm up. The reader circuitry finishes warming up at time 225. The write signal continues to alternate until time 227, at which time the reader bias current is activated. In some cases, the reader bias current is activated after a predetermined amount of time after a determination is made that the write signal has stopped alternating. In some implementations, the reader bias current is activated at substantially the same time that the alternating write signal stops. The reader circuitry and the reader bias current circuitry are substantially operational before or at substantially the same time as the start of the reading field, at time 230. The reading field lasts from 230 to 235 at which time the reader circuitry and the reader bias current are disabled. Once the reader bias current is disabled, the alternating write signal starts back up to continue the write operation. The alternating write signal may not start back up until a determination is made that the reader bias current is completely disabled.

Figure 3:
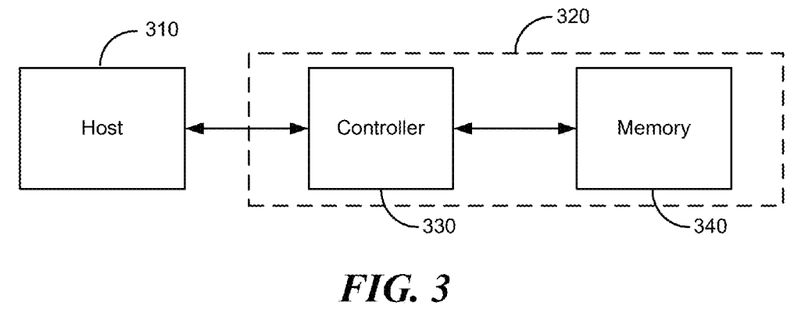
FIG. 3 is a block diagram of a computing system capable of performing a reader bias current enable at a different time than the reader circuitry according to various embodiments.

FIG. 3 is a block diagram of a computing system capable of performing a reader bias enable at a different time than the reader circuitry. FIG. 3 includes a host 310 and a memory device 320. The memory device 320 includes a controller 330 and memory 340. The host 310 may be any type of computing system. The controller 330 facilitates communication between the host 310 and the memory 340. The memory may be of various types comprising, magnetic data storage drives and/or hybrid drives that incorporate both magnetic drives and solid state media.

The techniques and structures described herein may be used, for example in a magnetic data storage device such as a hard drive. A hard drive generally includes at least one magnetic disk that rotates around a spindle axis. The drive further includes one or more transducer heads positioned over a surface of the disk while reading from or writing to the disk.

The one or more transducer heads may include both magnetic read and write heads. A reader generally operates by detecting a changing magnetic field, e.g., changes in direction of magnetic flux caused by relative motion between an encoded magnetic media and the read head. The writer operates in response to a write current which generates a magnetic field at a tip of a write pole. This magnetic field in turns changes the orientation of a local magnetic field local at the surface of the disk, causing data to be persistently stored on the disk. A preamplifier circuit can be used to apply current to the heads. The preamplifier may include a serial interface that can be used to enable the reader bias current at a different time than the reader circuitry.

The reader bias current may be enabled at a different time than the reader circuitry in a variety of ways. In some cases, the reader bias current is initiated at a different time than the read circuitry by using an existing serial interface (SIF) for the preamplifier. The SIF is conventionally used for serial transfer of packets used to read and write preamplifier registers, but may, according to various embodiments described herein, be used to issue a signal to enable a reader bias current at times in which the transfer of packets is not occurring.

Figure 4:
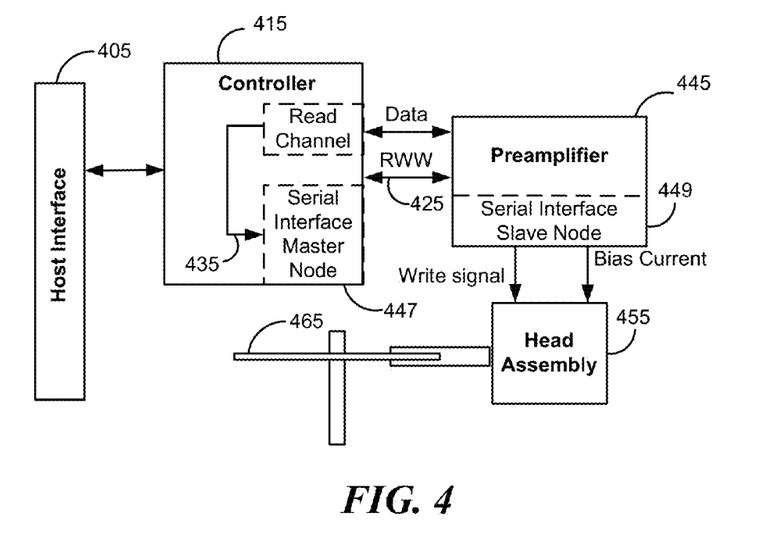
FIG. 4 illustrates a block diagram of a hard drive apparatus capable of performing a reader bias current enable at a different time than the reader circuitry in accordance with various implementations.

FIG. 4 illustrates a block diagram of a hard drive apparatus in accordance with embodiments described herein. The apparatus may be coupled to a host device via a host interface 405. The host device may include any electronic device that can be communicatively coupled to store and retrieve data from an HDD, e.g., a computer or a server. According to various embodiments, during a write operation, the controller 415 may determine that there is an upcoming reading field. In response to the determination, the controller 415 sends a signal to the preamplifier to initiate a switch from a write mode to an RWW mode. The signal to start RWW mode 425 causes the read circuitry to start warming up. At a predetermined time before the reading field, the controller 415 stops the write signal from alternating. After or at the same time that the write signal stops alternating, the controller and/or read channel sends a reader bias enable signal 435 to the serial interface master node 447. The reader bias enable signal 435 tells the serial interface to issue a pulse that causes the reader bias current circuitry to turn on. A serial interface signal is sent to the serial interface slave node 449 to send a signal to enable the reader bias current. The bias current source switch is closed allowing the reader bias current to be enabled in response to the pulse. Once the read circuitry is warmed up and the reader bias current circuitry is turned on, the reading field may be read by the device. During the reading field, the head assembly 455 allows data to be read from the storage media 465.

Figure 5A:
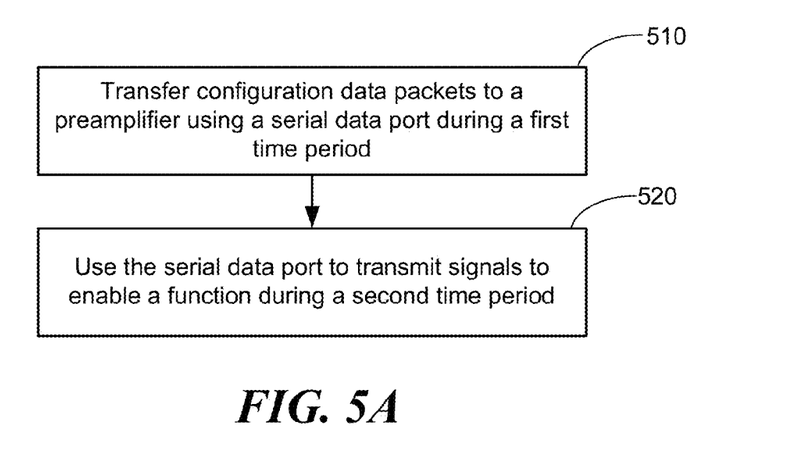
FIG. 5A is a flow diagram that describes a process that uses the serial interface to enable the reader bias current according to various embodiments.

FIG. 5A is a flow diagram that describes a process that uses the serial interface to enable the reader bias current. According to FIG. 5A, configuration data packets are transferred 510 to a preamplifier using a serial data port during a first time interval. In some cases, the first time period occurs when no media read or write activity is occurring. In other cases, the first time period may occur during a read and/or write operation. During a second time period at least one pin of the serial data port is used 520 to transmit a signal that enables a function of the preamplifier, such as an RWW function, for example. The second time period may occur while any read and/or write operation is occurring or in preparation for an RWW mode, for example. In some cases, the second time period takes place during an RWW mode of the memory device.

Figure 5B:
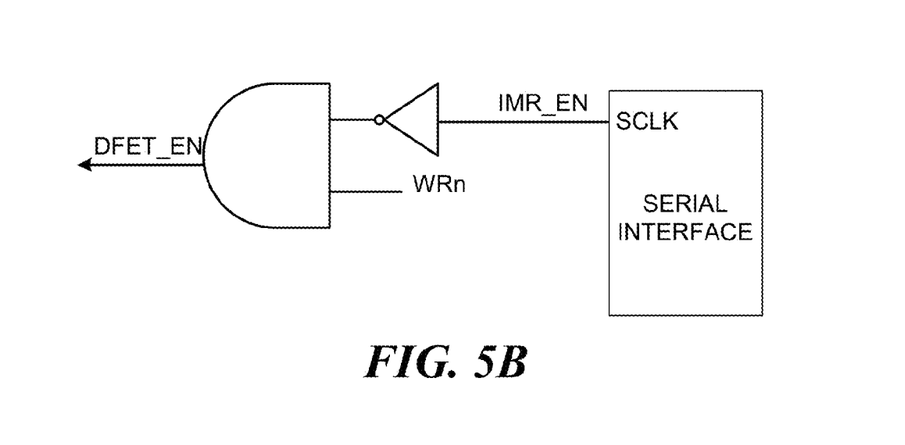
FIG. 5B is a schematic diagram illustrating the use of a serial interface output to develop an enable signal for gain control.

In some cases the serial interface is used to issue a pulse to enable other functionality of the device. For example, the serial interface may be used to issue a signal that enables a transistor that may be used to reduce a gain in a read data path during a timing latency testing such as an existing depletion field effect transistor (DFET) within the preamplifier, for example. This may be used, for example, in a hard disk drive that manages a large capacity of information being written to and retrieved from the media controlled by the drive. Such systems use positioning by reference to the read location in order to determine the correct write location. To do so requires an adjustment between the read location to account for the small distance between the read head and the write head for the write operation. In addition to the actual distance, the latency due to the electronics may also be taken into account. In some cases, measuring the round-trip latency for the read and write paths causes the read/write paths to become saturated making latency measurement difficult. Enabling the existing DFET using the serial interface allows for the gain of the read data path to be reduced so that an accurate latency measurement can be made. FIG. 5B illustrates one example technique for developing the enable signal (DFET_EN) for the MOSFET to provide gain control. This example includes using a output of a serial interface (SIF) of the read preamplifier to provide the DFET_EN signal during latency testing. As previously discussed, the SIF may be used to transfer serial configuration data from the controller to the preamplifier. Any output of the SIF may be used for DFET_EN so long as the timing of the use of the SIF output for DFET_EN does not conflict with the other uses for the output. For example, if SCLK is used to develop the DFET_EN signal, the SCLK signal would be used for DFET_EN during periods that it was not otherwise being used, e.g., to clock in configuration data from the controller.

The reader bias current is generally substantially zero during the timing latency testing to prevent potential damage to the read transducer. The bias current enable signal (IMR_EN) enables the reader bias current. The gain control element (the DFET) is enabled only when the IMR_EN is low. In the example shown in FIG. 5B, the SCLK output of the SIF provides the reader bias current enable IMR_EN. The inverse of the IMR_EN signal is ANDed with the Write/Read Mode signal (WRn) to produce DFET_EN. It will be appreciated that there are many other ways to derive the DFET_EN that involve dual purpose use of a signal that is used during other times for a function other than DFET_EN. The dual purpose SIF implementations discussed above may allow for the use of existing components in the read path to derive various other control signals.

Figure 5C:
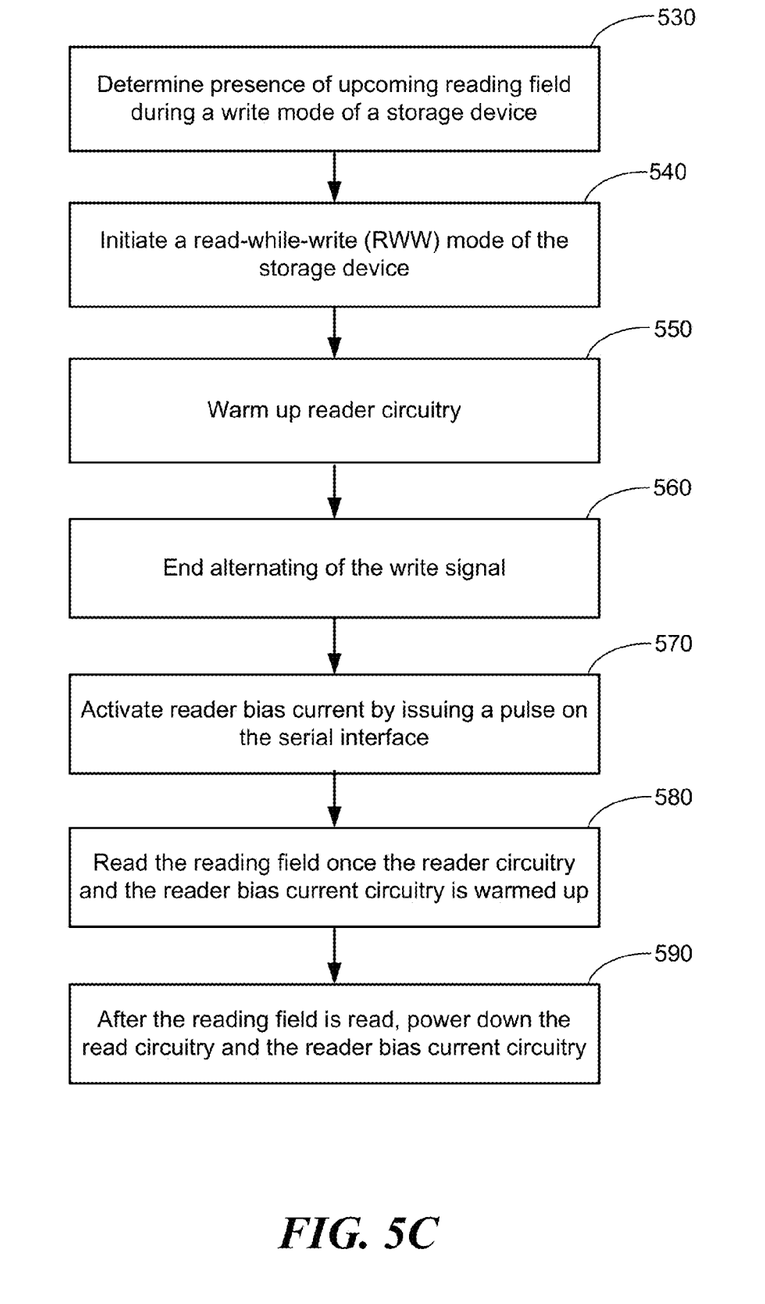
FIG. 5C is a more detailed flow diagram illustrating a process for switching from a write mode to an RWW mode using a serial interface to enable the reader bias current in accordance with embodiments described herein.

FIG. 5C is a more detailed flow diagram illustrating a process for switching from a write mode to an RWW mode using a serial interface to enable the reader bias current. A presence of an upcoming reading field is determined 530 during a write mode of a storage device. A RWW mode is initiated 540 in response to the upcoming reading field. The reader circuitry is warmed up 550. The alternating of the write signal is ended 560. In some cases, ending the write signal means switching from an alternating write signal to a DC write signal. Using an RWW mode during the reading of the timing field allows the write circuits to remain active during the reading of the reading field facilitating a fast switch from the RWW mode back to a write mode. According to various implementations, ending the alternating write signal means switching from an RWW mode to a read mode so that the write circuits are powered down during the reading of the reading field. After the alternating write signal has ended, the reader bias current is enabled 570 by issuing a pulse on the serial interface. The reading field is read 580 once the reader circuitry and the reader bias current circuitry have warmed up. After the reading field is read, the reader circuitry and the reader bias current circuitry are disabled and powered down 590. In some cases, after the reading field is read, the RWW mode ends and a write operation continues by powering down the read circuitry and the reader bias current circuitry. In some cases after the read circuitry and the reader bias current circuitry are powered down, the device switches to an idle mode.

Figure 6A:
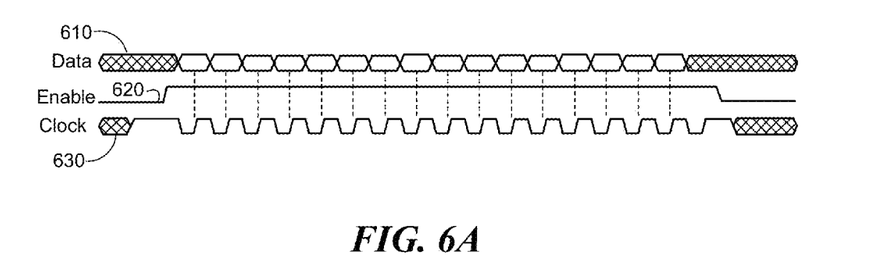
FIGS. 6A and 6B illustrate the signals that are used by the SIF in accordance with various implementations.
Figure 6B:
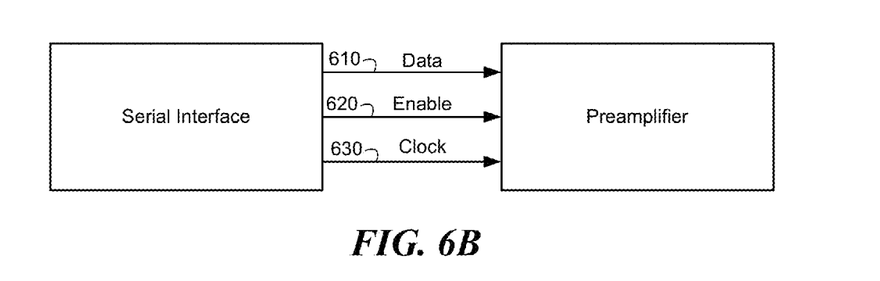

FIGS. 6A and 6B illustrate the signals that are used by the SIF. Three signals are used, a Data signal 610, an Enable signal 620, and a Clock signal 630. The Enable signal 620 is asserted to instruct the preamplifier that a transfer of serial data is starting. Bits are sent out on the data signal and the Clock signal 630 is used to clock the address bits to the preamplifier serial interface logic and data bits to or from the addressed preamplifier register. Once the bits have been transferred to and/or the preamplifier's register, the Enable signal 620 de-asserts. In some cases, the Clock signal 630 is ignored when the Enable signal is de-asserted. According to various embodiments, when the Enable signal 620 is de-asserted, the Clock 630 signal can be used for other purposes, such as for a signal to enable the reader bias current.

Figure 7:
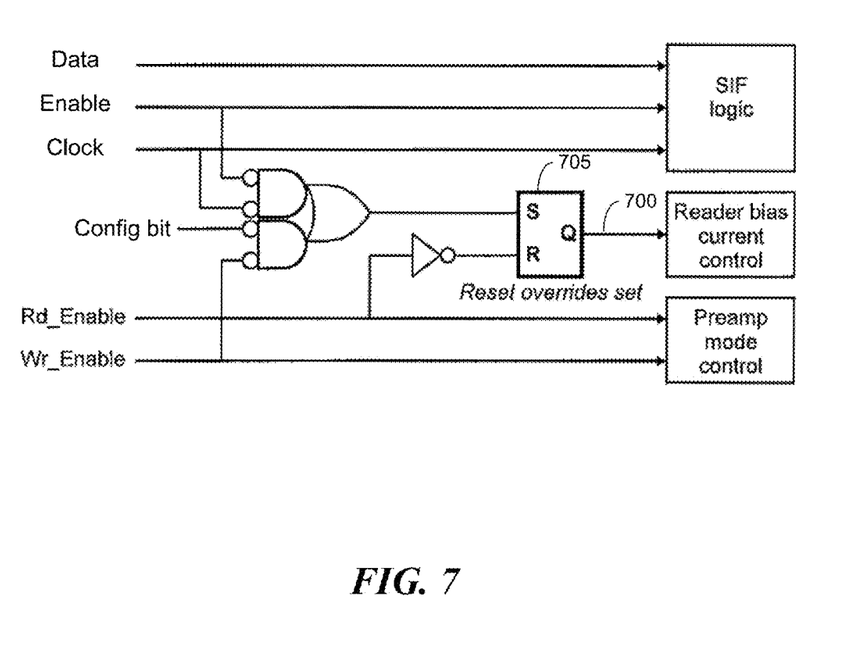
FIG. 7 is a diagram of a circuit that is capable of using the serial interface signals to enable a reader bias current of a memory device in accordance with various implementations.

FIG. 7 is a diagram of a circuit that is capable of using the serial interface signals to enable a reader bias current of a memory device. Using the circuit of FIG. 7, the SIF can be used to control the reader bias current enable 700 in conjunction with a transition from write mode to RWW mode. In some implementations, the functionality of enabling reader bias current upon entering read mode may also be retained. In some cases, control of reader bias current enable can be used any time read functionality is enabled, either by entering read mode from idle or entering RWW mode from write mode. In some cases, the SIF Enable signal is used to discriminate between the use of the Clock signal as a SIF clock and as a reader bias current enable signal.

According to the diagram of FIG. 7, when Rd_Enable is de-asserted, the flip flop 705 is unconditionally held reset, disabling reader bias current, and the SIF signals can be used for serial interface transfers, having no effect on reader bias current control. The flip-flop 705 of FIG. 7 is a Reset-Overrides-Set type so the Set input has no effect when Rd_Enable is de-asserted. When Rd_Enable is asserted, the flip flop may be set by a pulse on its S input allowing the reader bias current enable 700 to be asserted.

A configuration bit may be used to determine whether the SIF control of the reader bias current is in effect for RWW mode or for both RWW and read modes. If the configuration bit is asserted, the Wr_Enable signal has no effect, so the flip flop 705 is enabled to be set either in read mode or RWW mode. In some cases, the flip flop 705 is set by a low-going pulse on Clock while the SIF Enable is held de-asserted. When a SIF transfer is not active, Enable is low and Clock is held high. According to the diagram of FIG. 7, if the configuration bit is de-asserted, then the flip flop's Set input is asserted whenever Wr_Enable is low. Thus in the configuration of FIG. 7, bias current is enabled upon entry into read mode (Rd_Enable asserted, Wr_Enable de-asserted), but still controlled by Clock when entering RWW mode. In some cases, SIF transfers may continue after a RWW mode is enabled up until substantially the time that the reader bias current is enabled. In some cases, the Enable is held high when a low going pulse is issued on the Clock allowing on-going SIF transfers to overlap the interval between the time RWW mode is first enabled and when the Clock pulse is issued to enable bias current.

The circuit of FIG. 7 allows read functionality to be enabled without automatically enabling bias current. The bias current may be enabled by a subsequent pulse on the Clock pin allowing RWW mode to be enabled arbitrarily early when writing without risk of electrical overstress. To prevent electrical overstress, the controller, having the ability to control the timing of events relative to the media format, generates a pulse on Clock when the alternating write signal has ceased. Additionally or alternatively, the controller may determine that no SIF transfers are in progress between the time RWW is enabled and when the pulse on the Clock line is issued to enable bias current. In some cases, the controller can buffer serial interface packets issued by firmware during a "blackout window" prior to entering RWW, and can issue the buffered SIF packets after the RWW mode ends. In some cases, SIF packets are not issued during time periods in which the device is in a write and/or read mode. According to various implementations, reader bias current is disabled at substantially the same time as the read functionality is disabled. In some cases, the reader bias current is enabled at a different time than the read circuitry by using a fault signal output by the preamplifier to the controller.

Figure 8A:
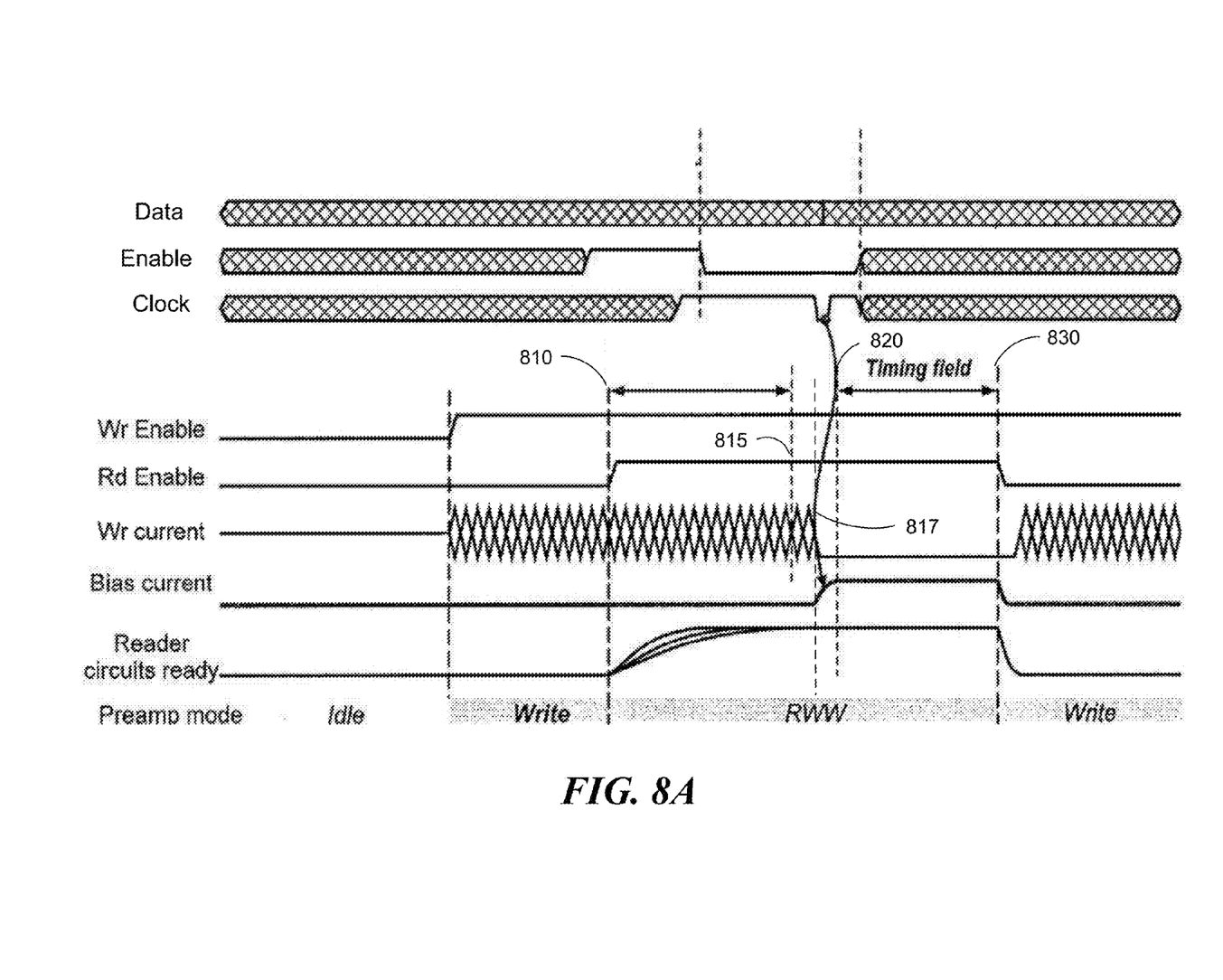
FIGS. 8A-8B are timing diagrams that use a pulse on the serial Clock pin to enable the reader bias current in accordance with embodiments described herein.
Figure 8B:
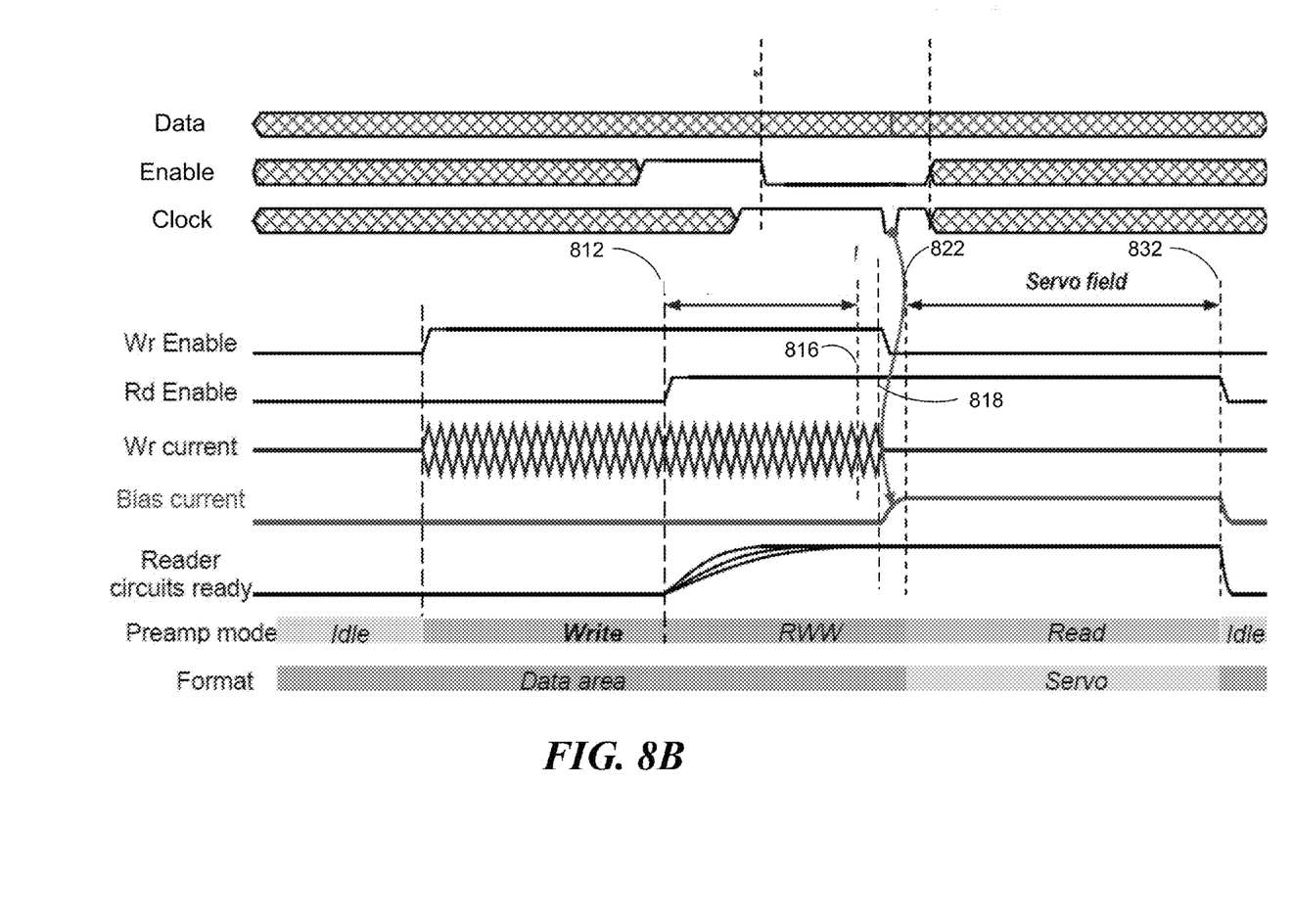

FIGS. 8A-8B are timing diagrams that use a pulse on the serial Clock pin to enable the reader bias current. FIG. 8A illustrates a diagram in which a switch from a write mode to an RWW mode is initiated by a determination of an upcoming timing field. Timing fields can be used in devices utilizing bit patterned media to read and/or demodulate timing fields interspersed in the data fields, for example. In some cases, enabling an RWW mode allows the device to avoid the overhead of disabling and re-enabling write functionality before and after the timing fields. According to various implementations, the preamplifier continues writing while the timing field is read and/or demodulated. During the reading and/or demodulating of the timing field, the flow of write data to the preamplifier may be suspended and DC writing is done during this time.

In some cases, the read circuitry is warmed up in response to a determination of an upcoming timing field at time 810. While the read circuitry is warming up, from time 810 to time 815, the write signal continues to alternate as is shown in FIG. 8A. At a predetermined period of time before the timing field, the alternating write signal is stopped and switches to a DC write signal at time 817 and a pulse on the serial clock is issued that allows the reader bias current to be enabled. The reader bias current is activated from about time 817 to time 820, and the timing field is read and/or demodulated from about time 820 and ending about at time 830. Once the timing field is read, the device switches back to a write mode by disabling and powering down the read circuitry and the reader bias current circuitry and the write signal begins to alternate again without having to warm up the write circuitry.

FIG. 8B illustrates another example in accordance with embodiments disclosed herein. According to FIG. 8B, a determination that a servo field is coming up prompts the switch from a write mode to an RWW mode at time 812. FIG. 8B illustrates a diagram in which a switch from a write mode to an RWW mode is initiated by a determination of an upcoming servo field. Servo fields can be used in devices utilizing continuous media to read and/or demodulate servo fields interspersed in the data fields, for example. The determination of an upcoming servo field enables the read circuitry allowing it to warm up, from time 812 to time 816, while the write signal continues to alternate. A predetermined period of time before the servo field, the write signal stops alternating at time 818, allowing the reader bias current circuitry to be activated from about time 818 to about time 822. Before or at substantially the same time as the servo field begins the RWW mode ends and read mode begins. The reader bias current circuitry is enabled by a signal issued by the serial Clock. At the time that the servo field starts, the reader circuitry and the reader bias circuitry are substantially operational. The servo field is then read from time 822 to time 832, while in read mode. At the end of the servo field, at about time 832, the read mode ends, disabling the reader circuitry and the reader bias current. In some cases, the reader circuitry and the reader bias current are not disabled at the end of the servo field.

It is to be understood that this detailed description is illustrative only, and various additions and/or modifications may be made to these embodiments, especially in matters of structure and arrangements of parts. Accordingly, the scope of the present disclosure should not be limited by the particular embodiments described above, but should be defined by the claims set forth below and equivalents thereof.

What is claimed is:

1. A device configured to enable a read while write (RWW) function in a non-volatile storage device, comprising:
    preamplifier circuitry;
    serial interface circuitry coupled to the preamplifier circuitry; and
    a controller configured to:
        transfer configuration data packets to the preamplifier using the serial interface circuitry during a first time period;
        use one or more output pins of the serial interface circuitry to enable the function during a second time period in which the configuration data packets are not transferred;
        initiate a warm-up of read circuitry during a write mode of the memory device;
        end an alternating write signal at a predetermined amount of time after initiating the warm-up; and
        use a serial data port of the serial interface circuitry to transmit a reader bias current enable signal after ending the alternating write signal.

2. The device of claim 1, wherein the first time period is during a time in which no reads or writes are occurring.

3. The device of claim 1, wherein the data packets are used to configure reading and writing preamplifier registers.

4. The device of claim 1, wherein the preamplifier circuitry is further configured to activate the reader bias current after warming up the reader circuitry.

5. A device configured to enable a read while write (RRW) function in a non-volatile storage device, comprising:
    preamplifier circuitry;
    serial interface circuitry coupled to the preamplifier circuitry; and
    a controller configured to:
        transfer configuration data packets to the preamplifier using the serial interface circuitry during a first time period; and
        use one or more output pins of the serial interface circuitry to enable the RRW function during a second time period in which the configuration data packets are not transferred.

6. The device of claim 5, wherein the first time period is during a time in which no reads or writes are occurring.

7. The device of claim 5, wherein the data packets are used to configure reading and writing preamplifier registers.

8. The device of claim 5, wherein the controller is further configured to:
    initiate a warm-up of read circuitry during a write mode of the memory device;
    end an alternating write signal at a predetermined amount of time after initiating the warm-up; and
    use a serial data port of the serial interface circuitry to transmit a reader bias current enable signal after ending the alternating write signal.

9. The device of claim 8, wherein the preamplifier circuitry is further configured to activate the reader bias current after warming up the reader circuitry.

10. A method for enabling a read while write (RRW) function in a non-volatile storage device, comprising:
    transferring configuration data packets to a preamplifier using a serial data port during a first time period; and
    using one or more output pins of the serial data port to enable the RWW function during a second time period in which the configuration data packets are not transferred.

11. The method of claim 10, wherein the first time period is during a time in which no reads or writes are occurring.

12. The method of claim 10, wherein the data packets are used to configure reading and writing preamplifier registers.

13. The method of claim 10 further comprising, using the one or more pins of the serial data port to transmit signals to enable a reader bias current during the second time period.

14. The method of claim 10, wherein the RWW function comprises:
    initiating a warm-up of read circuitry during a write mode of the memory device;
    ending an alternating write signal at a predetermined amount of time after initiating the warm-up; and
    using the serial data port to transmit a reader bias current enable signal after ending the alternating write signal.

15. The method of claim 14, wherein using the serial data port to transmit a reader bias current enable signal further comprises using the serial data port to transmit a reader bias current enable signal after warming up the read circuitry.

16. The method of claim 10, wherein the second time period is during a time where at least one of a read operation and a write operation is occurring.

17. The method of claim 10, wherein the second time period is during a read while write (RWW) mode of the storage device.

* * * * *